US012350850B2

(12) United States Patent
Walker, Jr. et al.

(10) Patent No.: US 12,350,850 B2
(45) Date of Patent: Jul. 8, 2025

(54) RAZOR CARTRIDGE

(71) Applicant: The Gillette Company LLC, Boston, MA (US)

(72) Inventors: Vincent Paul Walker, Jr., Bridgewater, MA (US); Jack Anthony Washington, Mendon, MA (US); Tina Marie Hallett, Weymouth, MA (US); Matthew Frank Murgida, Somerville, MA (US); Ulises Hernando Bautista, Boston, MA (US)

(73) Assignee: The Gillette Company LLC, Boston, MA (US)

( * ) Notice: Subject to any disclaimer, the term of this patent is extended or adjusted under 35 U.S.C. 154(b) by 0 days.

(21) Appl. No.: 18/344,216

(22) Filed: Jun. 29, 2023

(65) Prior Publication Data

US 2023/0339131 A1 Oct. 26, 2023

Related U.S. Application Data

(62) Division of application No. 16/841,375, filed on Apr. 6, 2020, now Pat. No. 11,794,363.

(60) Provisional application No. 62/829,387, filed on Apr. 4, 2019.

(51) Int. Cl.

| | |
|---|---|
| ***B26B 21/40*** | (2006.01) |
| *B26B 21/06* | (2006.01) |
| *B26B 21/22* | (2006.01) |

(52) U.S. Cl.

CPC ...... *B26B 21/4037* (2013.01); *B26B 21/4031* (2013.01); *B26B 21/4068* (2013.01); *B26B 21/06* (2013.01); *B26B 21/222* (2013.01)

(58) Field of Classification Search

CPC ..... B26B 21/06; B26B 21/222; B26B 21/227; B26B 21/4037; B26B 21/4031; B26B 21/4068

USPC .......................................................... 30/47–51

See application file for complete search history.

(56) References Cited

U.S. PATENT DOCUMENTS

| | | | |
|---|---|---|---|
| 2,171,880 | A | 9/1939 | Harrison |
| 2,234,440 | A | 3/1941 | Harrison |
| 3,505,734 | A | 4/1970 | Iten |
| 4,094,066 | A | 6/1978 | Daniel, Jr. |
| 4,211,006 | A | 7/1980 | Caco |
| 4,409,735 | A | 10/1983 | Cartwright et al. |

(Continued)

FOREIGN PATENT DOCUMENTS

| | | | |
|---|---|---|---|
| CA | 212862 | S | 2/2024 |
| CN | 301396370 | S | 11/2010 |

(Continued)

OTHER PUBLICATIONS

PCT Search Report and Written Opinion for PCT/US2020/026279 dated Jun. 23, 2020, 11 pages.

(Continued)

*Primary Examiner* — Jason Daniel Prone

(74) *Attorney, Agent, or Firm* — John M. Lipchitz

(57) ABSTRACT

A subassembly for a shaving razor cartridge with a base having a front wall with a top surface and a rear wall with a top surface. At least one blade is mounted to the base between the front wall and the rear wall. The at least one blade has a cutting edge positioned at least 0.5 mm below a plane tangent to the top surface of the front wall and the top surface of the rear wall.

3 Claims, 6 Drawing Sheets

(56) References Cited

U.S. PATENT DOCUMENTS

| | | | |
|---|---|---|---|
| 4,854,043 | A | 8/1989 | Chen |
| 4,914,817 | A | 4/1990 | Galligan |
| D312,144 | S | 11/1990 | Buba |
| 5,386,750 | A | 2/1995 | Morrison |
| 5,412,872 | A | 5/1995 | Iderosa |
| D366,611 | S | 1/1996 | Poisson |
| D397,290 | S | 8/1998 | Poisson et al. |
| 5,794,343 | A | 8/1998 | Lee |
| 6,216,349 | B1 | 4/2001 | Gilder et al. |
| 6,243,951 | B1 | 6/2001 | Oldroyd |
| 6,295,734 | B1 | 10/2001 | Gilder et al. |
| 7,322,109 | B2 | 1/2008 | Newkirk |
| 7,448,135 | B2 | 11/2008 | Zhuk et al. |
| D601,753 | S | 10/2009 | Cataudella et al. |
| D602,634 | S | 10/2009 | Cataudella et al. |
| D611,199 | S | 3/2010 | Kwiecien et al. |
| D616,606 | S | 5/2010 | Adams |
| D617,497 | S | 6/2010 | Goodhead |
| D619,301 | S | 7/2010 | Wattam |
| D620,196 | S | 7/2010 | Nicoll |
| D625,049 | S | 10/2010 | Bridges et al. |
| D630,109 | S | 1/2011 | Wonderley |
| D630,377 | S | 1/2011 | Wattam |
| D630,797 | S | 1/2011 | Witkus |
| D633,254 | S | 2/2011 | Witkus |
| 7,954,244 | B2 | 6/2011 | Orloff et al. |
| 8,015,710 | B1 | 9/2011 | Zyla |
| D649,712 | S | 11/2011 | Pan et al. |
| D658,809 | S | 5/2012 | Jessemey et al. |
| 8,191,265 | B2 | 6/2012 | Micinilio |
| D665,948 | S | 8/2012 | Jessemey et al. |
| 8,336,212 | B2 | 12/2012 | Bozikis et al. |
| 8,584,848 | B1 | 11/2013 | Lee et al. |
| 8,707,562 | B2 | 4/2014 | Coffin |
| 9,015,951 | B2 | 4/2015 | Howell et al. |
| D754,400 | S | 4/2016 | Andersson |
| D756,565 | S | 5/2016 | Andersson |
| 9,751,226 | B2 | 9/2017 | Psimadas |
| 9,919,441 | B2 | 3/2018 | Drori |
| D832,514 | S | 10/2018 | Bozikis et al. |
| D832,515 | S | 10/2018 | Bozikis et al. |
| 10,144,142 | B1 | 12/2018 | Squires et al. |
| 10,369,713 | B1 | 8/2019 | Squires |
| 10,442,097 | B2 | 10/2019 | Bozikis |
| D874,727 | S | 2/2020 | Washington et al. |
| D886,380 | S | 6/2020 | Washington et al. |
| D890,429 | S | 7/2020 | Chae |
| D890,995 | S | 7/2020 | Long et al. |
| 10,780,596 | B2 | 9/2020 | Squires et al. |
| 10,836,060 | B2 | 11/2020 | Squires et al. |
| D905,908 | S | 12/2020 | Washington et al. |
| D908,285 | S | 1/2021 | Cataudella et al. |
| 11,000,960 | B1 | 5/2021 | Hooberman |
| D921,984 | S | 6/2021 | Brissett et al. |
| D926,374 | S | 7/2021 | Washington et al. |
| 11,117,280 | B2 | 9/2021 | Zucker |
| D940,394 | S | 1/2022 | Fyfield et al. |
| D947,451 | S | 3/2022 | Fernald et al. |
| D948,122 | S | 4/2022 | Fernald |
| D951,541 | S | 5/2022 | Fyfield et al. |
| D964,651 | S | 9/2022 | Washington |
| D964,653 | S | 9/2022 | Washington et al. |
| D982,829 | S | 4/2023 | Youngjin |
| 11,794,363 | B2 * | 10/2023 | Walker, Jr. .......... B26B 21/4037 |
| D1,003,706 | S | 11/2023 | Goncalez |
| D1,004,195 | S * | 11/2023 | Crowley ........................ D28/47 |
| D1,016,392 | S * | 2/2024 | Washington ................... D28/47 |
| D1,017,427 | S | 3/2024 | Castillo |
| D1,021,247 | S | 4/2024 | Ramm |
| D1,022,320 | S * | 4/2024 | Fang .............................. D28/47 |
| D1,045,217 | S * | 10/2024 | Washington ................... D28/47 |
| 2002/0000040 | A1 | 1/2002 | Gilder |
| 2002/0083600 | A1 | 7/2002 | Donovan |
| 2003/0159291 | A1 | 8/2003 | Clark |
| 2005/0198837 | A1 | 9/2005 | Rawle |
| 2007/0028450 | A1 | 2/2007 | Pennell et al. |
| 2007/0227008 | A1 | 10/2007 | Zhuk et al. |
| 2008/0250644 | A1 | 10/2008 | Orloff et al. |
| 2010/0011586 | A1 | 1/2010 | Goodhead |
| 2010/0058595 | A1 | 3/2010 | Walker, Jr. et al. |
| 2010/0122464 | A1 | 5/2010 | Ndou et al. |
| 2010/0218381 | A1 | 9/2010 | Follo |
| 2011/0094108 | A1 | 4/2011 | Wain |
| 2011/0162208 | A1 | 7/2011 | Wain |
| 2011/0162209 | A1 | 7/2011 | Wain |
| 2012/0110857 | A1 | 5/2012 | Peterson et al. |
| 2013/0199346 | A1 | 8/2013 | Psimadas |
| 2014/0026424 | A1 | 1/2014 | Oglesby et al. |
| 2014/0283387 | A1 | 9/2014 | Bozikis et al. |
| 2015/0101195 | A1 | 4/2015 | Long et al. |
| 2016/0199992 | A1 | 7/2016 | Nicholas |
| 2016/0279815 | A1 | 9/2016 | Washington |
| 2017/0210020 | A1 | 7/2017 | Bozikis |
| 2017/0266826 | A1 | 9/2017 | Kole et al. |
| 2018/0169879 | A1 | 6/2018 | Psimadas |
| 2018/0333879 | A1 | 11/2018 | Squires |
| 2019/0047165 | A1 | 2/2019 | Gegg et al. |
| 2019/0134833 | A1 | 5/2019 | Kole |
| 2019/0255720 | A1 | 8/2019 | Galanis |
| 2020/0316798 | A1 | 10/2020 | Walker, Jr. et al. |
| 2020/0338770 | A1 | 10/2020 | Moustakas |
| 2020/0398449 | A1 | 12/2020 | Claus et al. |
| 2021/0323180 | A1 | 10/2021 | Shen et al. |
| 2024/0198547 | A1 * | 6/2024 | Kopelas ................ B26B 21/227 |
| 2024/0286303 | A1 * | 8/2024 | Yang ................... B26B 21/4031 |
| 2024/0286304 | A1 * | 8/2024 | Yang ..................... B26B 21/222 |
| 2025/0010503 | A1 * | 1/2025 | Park ...................... B26B 21/222 |

FOREIGN PATENT DOCUMENTS

| | | | |
|---|---|---|---|
| CN | 102232011 | A | 11/2011 |
| CN | 102947062 | A | 2/2013 |
| CN | 303097330 | S | 2/2015 |
| CN | 104440969 | A | 3/2015 |
| CN | 105358294 | A | 2/2016 |
| CN | 105939824 | A | 9/2016 |
| CN | 107810092 | A | 3/2018 |
| CN | 304543338 | S | 3/2018 |
| CN | 304883655 | S | 11/2018 |
| CN | 109476028 | A | 3/2019 |
| CN | 305061379 | S | 3/2019 |
| CN | 305298920 | S | 8/2019 |
| CN | 305475417 | S | 12/2019 |
| CN | 306599847 | S | 6/2021 |
| CN | 306781319 | S | 8/2021 |
| CN | 306883357 | S | 10/2021 |
| CN | 307833166 | | 2/2023 |
| ID | A002023015640001 | | 6/2023 |
| IN | 370387001 | | 12/2022 |
| JP | H07303767 | A | 11/1995 |
| JP | H09168677 | A | 6/1997 |
| JP | H10506813 | A | 7/1998 |
| JP | D1090178 | S | 11/2000 |
| JP | 2001524860 | A | 12/2001 |
| JP | 2007531575 | A | 11/2007 |
| JP | 2013099467 | A | 5/2013 |
| JP | D1505214 | S | 8/2014 |
| JP | 2015062670 | A | 4/2015 |
| JP | 2015107360 | A | 6/2015 |
| JP | D1557296 | S | 8/2016 |
| JP | 2017522996 | A | 8/2017 |
| JP | D1635525 | S | 7/2019 |
| JP | 2020522332 | A | 7/2020 |
| JP | D1703041 | S | 12/2021 |
| KR | 20130053876 | A | 5/2013 |
| RU | 2408454 | C1 | 1/2011 |
| RU | 00083964 | | 12/2012 |
| WO | 2016036238 | A3 | 4/2016 |
| WO | 2017008856 | A1 | 1/2017 |
| WO | 2017137849 | A1 | 8/2017 |
| WO | 2018019953 | A1 | 2/2018 |
| WO | D102481 | S | 2/2019 |
| WO | DM/213219 | | 3/2021 |
| WO | D210828 | S | 4/2021 |

(56) References Cited

FOREIGN PATENT DOCUMENTS

| | | | |
|---|---|---|---|
| WO | 2021182831 | A1 | 9/2021 |
| WO | D2132190001 | S | 9/2021 |
| WO | D228635001 | | 4/2024 |

OTHER PUBLICATIONS

Gillette Guard Shaving Razor, first available on Sep. 7, 2020 on amazon.com, retrieved from: https://www.amazon.com/Gillette-Guard-Manual-Shaving-Blades/dp/BO8DP37XJY.

https://www.ebay.com/itm/96-Pcs-Gillette-Guard-Razor-Blades-Cartridges-For-Safe-Smooth-Shave-Gilette-/14283200630496 Pcs Gillette Guard Razor, www.ebay.com, downloaded Dec. 18, 2020, 2 pages (Year: 2020).

Dermaflash Essentials Dermaplaning Replenishment Kit, Amazon, Retrieved from Internet: https://www.amazon.com/DERMAFLASH-ESSENTIALS-Dermaplaning-Replenishment-Supply/dp/B09YW1N19Y, Retrieved date: Apr. 30, 2024, 6 pages.

Dermaplane Razor for Face, Amazon, Retrieved from Internet: https://www.amazon.com/MoHern-Dermaplane-Professional-Refills-Eyebrow/dp/B0CQVJ2R1V, Dec. 23, 2023, 5 pages.

Dermaplaning Tool for Face Exfoliation, Amazon, Retrieved from Internet: https://www.amazon.com/Dermaplaning- Exfoliation-Replaceable-Dermaplaner-Exfoliate/dp/B0BJPVV278, Retrieved date: Apr. 30, 2024, 8 pages.

Gillette Venus Facial Razor Refills, Amazon, Retrieved from Internet: https://www.amazon.com/Gillette-Venus-Dermaplaning-Exfoliating-Replacement/dp/B0BHKRCGD3, Retrieved date: Apr. 30, 2024, 6 pages.

Zilamgoo Dermaplane Razor for Women, Amazon, Retrieved from Internet: https://www.amazon.com/ZILAMGOO-Dermaplane-Removal-Personal-Eyebrow/dp/B0C36GKY4K, Retrieved date: Apr. 30, 2024, 5 pages.

* cited by examiner

RAZOR CARTRIDGE

This application is a divisional from U.S. application Ser. No. 16/841,375 which is now U.S. U.S. Pat. No. 11,794,363.

FIELD OF THE INVENTION

The present invention relates to wet safety razors and more particularly to shaving razor cartridges that have a housing for guarding the skin against contact from one or more blades.

BACKGROUND OF THE INVENTION

In general, a cartridge or blade unit of a safety razor has at least one blade with a cutting edge which is moved across the surface of the skin being shaved by means of a handle to which the cartridge is attached. Some shaving razors are provided with a spring biased cartridge that pivots relative to the handle to follow the contours of the skin during shaving. The cartridge may be mounted detachably on the handle to enable the cartridge to be replaced by a fresh cartridge when the blade sharpness has diminished to an unsatisfactory level, or it may be attached permanently to the handle with the intention that the entire razor be discarded when the blade or blades have become dulled. Razor cartridges usually include a guard which contacts the skin in front of the blade(s) and a cap for contacting the skin behind the blade(s) during shaving. The cap and guard may aid in establishing the so-called "shaving geometry", i.e., the parameters which determine the blade orientation and position relative to the skin during shaving, which in turn have a strong influence on the shaving performance and efficacy of the razor. The cap may comprise a water leachable shaving aid to reduce drag and improve comfort. The guard may be generally rigid, for example formed integrally with a frame or platform structure which provides a support for the blades. Guards may also comprise softer elastomeric materials to improve skin 1 stretching.

In addition, covers have been developed that fit over shaving cartridges to facilitate cutting the hair to a specified length. These covers also guard the skin by raising the blades from the surface of the skin and thus limiting contact. However, since these covers are intended to be mounted over existing shaving razor cartridges that intended to shave the skin, the trimmer performance (i.e., cutting hair to length) of the cover is limited and not efficient. Thus, there is a need for a safety shaving razor that provides safe and efficient of cutting hair to a specified length.

SUMMARY OF THE INVENTION

In one aspect, the invention features, in general a subassembly for a shaving razor cartridge with a base having a front wall with a top surface and a rear wall with a top surface. At least one blade is mounted to the base between the front wall and the rear wall. The at least one blade has a cutting edge positioned at least 0.5 mm below a plane tangent to the top surface of the front wall and the top surface of the rear wall.

In another aspect, the invention features, in general a method of assembling a shaving razor cartridge by providing a base having a front wall with a top surface and a rear wall with a top surface. At least one blade having a cutting edge is mounted to the base between the front wall and the rear wall. The cutting edge is positioned at least 0.5 mm below a plane tangent to the top surface of the front wall and the top surface of the rear wall. A cage having a plurality of ribs is mounted to the base.

In another aspect, the invention features, in general a shaving razor cartridge with a base having a front wall with a top surface. A cage is fixed to the base. The cage has an upper skin contacting surface with a plurality of ribs defining a plurality of open slots and a front face generally transverse to the upper skin contacting surface. The front face has a lower surface interconnecting a plurality of ribs that define a plurality of open slots extending into the front face and are communication with the open slots of the upper skin contacting surface. At least one blade is mounted to the base. The blade has a cutting edge positioned below the upper skin contacting surface and immediately behind the front wall. The lower surface of the front face is positioned a vertical distance below the cutting edge.

BRIEF DESCRIPTION OF THE DRAWINGS

Other features and advantages of the present invention, as well as the invention itself, can be more fully understood from the following description of the various embodiments, when read together with the accompanying drawings, in which.

DETAILED DESCRIPTION OF THE INVENTION

Figure 1A:
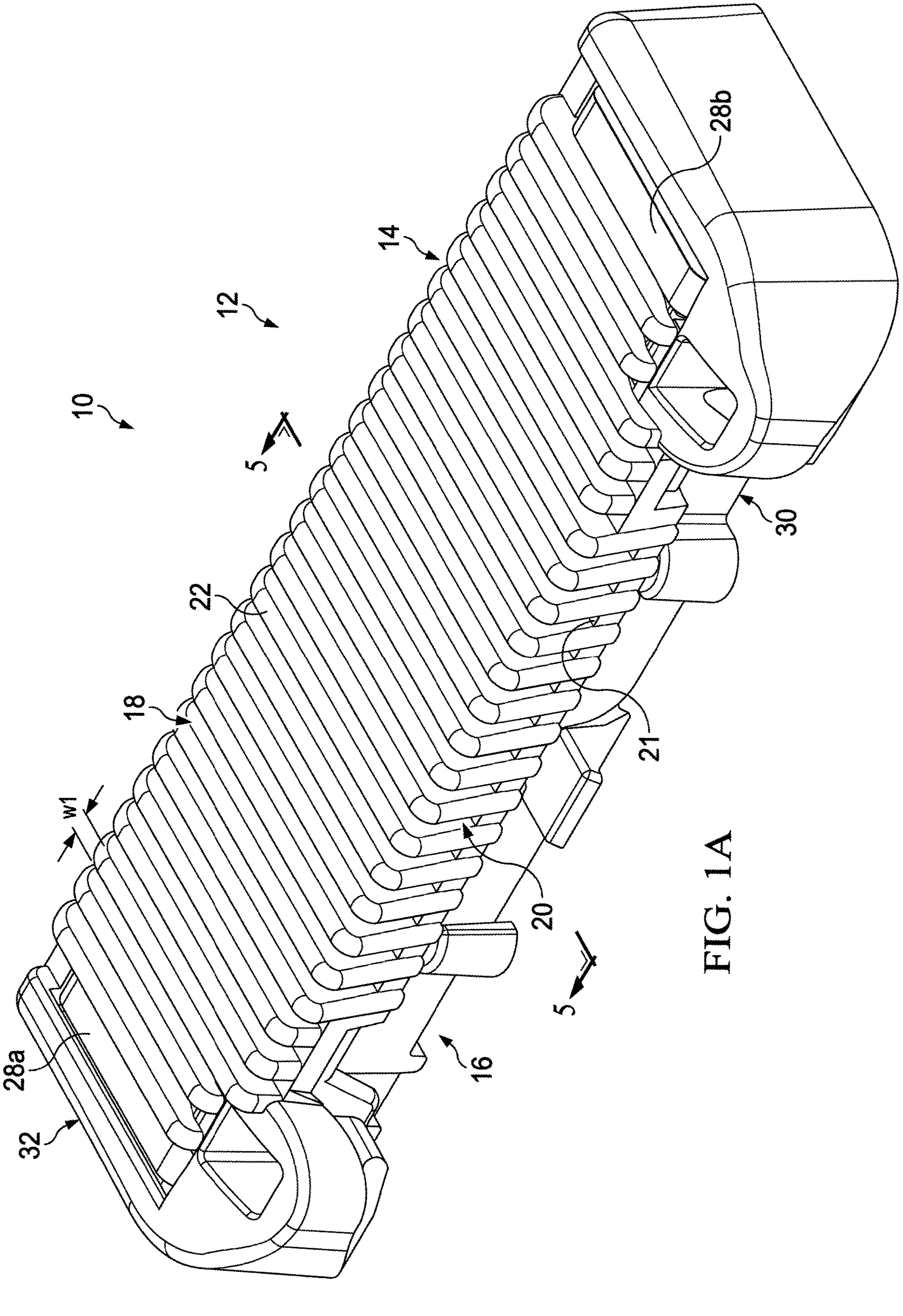
FIG. 1A is a front perspective view of a shaving razor cartridge according to one possible embodiment of the present invention.
Figure 1B:
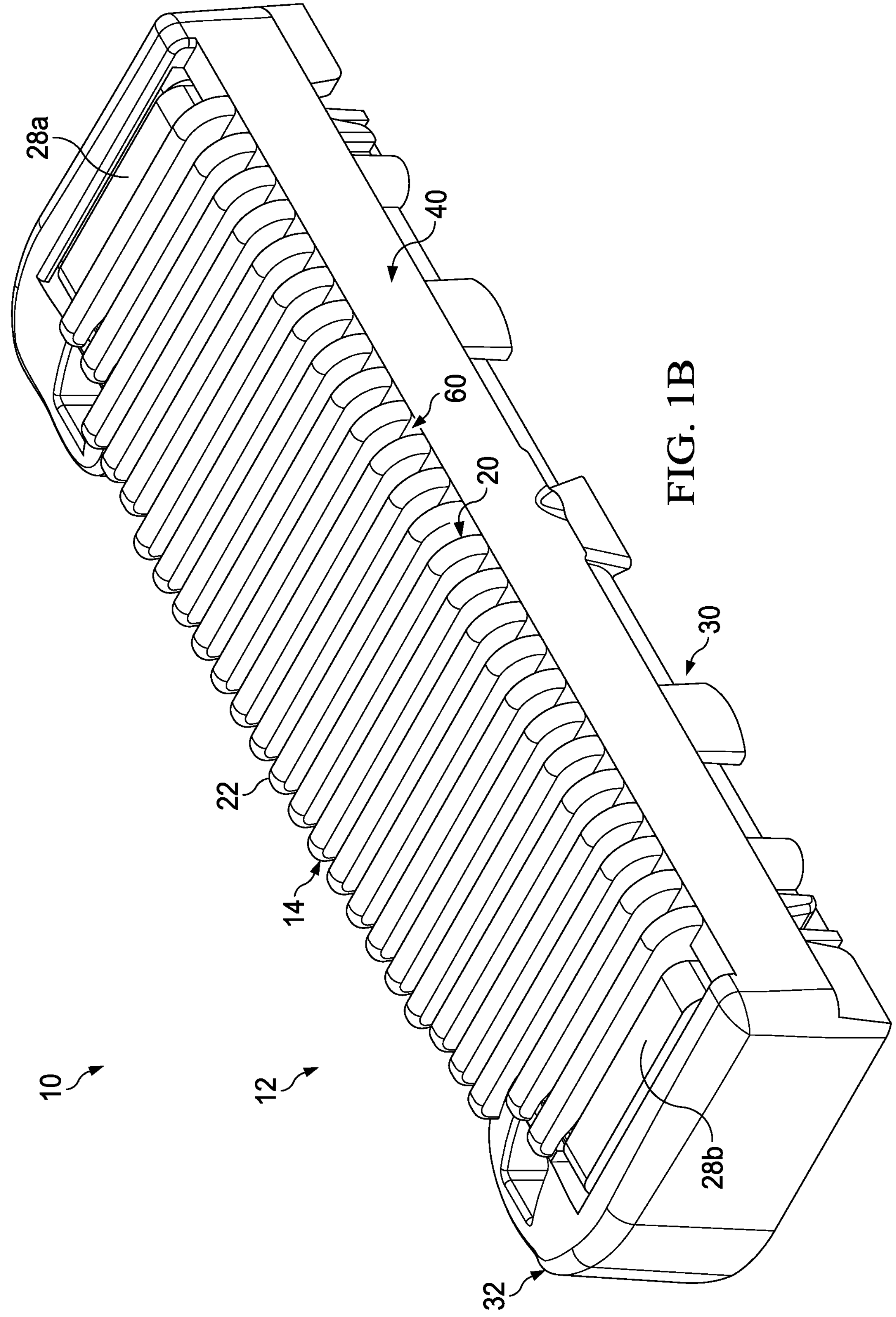
FIG. 1B is rear perspective view of the shaving razor cartridge of FIG. 1A.

Referring to FIGS. 1A and 1B, front and rear perspective views of a shaving razor cartridge are shown, respectively. The shaving razor cartridge 10 may be mounted to a handle (not shown).

The shaving razor cartridge 10 may be removable or permanently mounted to the handle. For example, the shaving razor cartridge 10 may be detachably mounted on a handle to enable the shaving razor cartridge 10 to be replaced by a fresh shaving razor cartridge 10 when the blade sharpness has diminished to an unsatisfactory level, or it may be attached permanently to the handle with the intention that the entire razor be discarded when the blade or blades have become dulled. The shaving razor cartridge 10 may include a housing 12. The housing 12 may be molded out of a polymeric material or manufactured from other materials, such as metal. The housing 12 may have an upper skin contacting surface 14 and a front face 16 that is transverse to the upper skin contacting surface 14. The upper skin contacting surface 14 may define a plurality of open slots 18 that are in communication with a plurality of corresponding open slots 20 defined by the front face 16. The open slots 18 may extend all the way to a rear face 40 (FIG. 1B) The open slots 20 may be defined and interconnected by a lower surface 21 of the front face. Accordingly, when hairs contact the front face 16, they are directed immediately to the open slots 20 (i.e., the open slots 20 extend into the front face 16). The open slots 18 and 20 may be separated by corresponding ribs 22. The ribs 22 may extend continuously along the upper skin contacting surface 14 and down the front face 16. Accordingly, the front face may be defined by a plurality of ribs 22 and the lower surface 21 to form the open slots 20. The ribs may have a width "w1" of about 0.25 mm to about 5 mm and preferably about 0.4 mm to about 1 mm. The ribs 22 may be spaced apart (i.e., width of the slots 18 and 20) by about 0.25 mm to about 5.0 mm and preferably about 0.7 mm to about 0.8 mm. If the spacing between adjacent ribs is too great, the blades may shave the philtrum (the vertical indentation in the middle area of the upper lip) rather than cutting the hair to length (e.g., the philtrum may sag between the ribs 22). In certain embodiments, the width "w1" may less than the distance between the ribs 22. As will be described in greater detail below, a ratio of the width to height of the ribs 22 should be sufficient to prevent the ribs 22 from breaking or deforming during use. Furthermore, the spacing of the ribs 22 (i.e., slot width) and the width of the ribs 22 may impact the efficiency of the blades to cut hair. For example, the width of the slots 18 and 20 should be large enough for hairs to pass through and the width of the ribs 22 should be large enough to provide sufficient strength without trapping a surplus of hairs. The dimensions of the ribs 22 may also prevent skin from sagging between the ribs 22 and contacting the skin during a shaving stroke.

Figure 2:
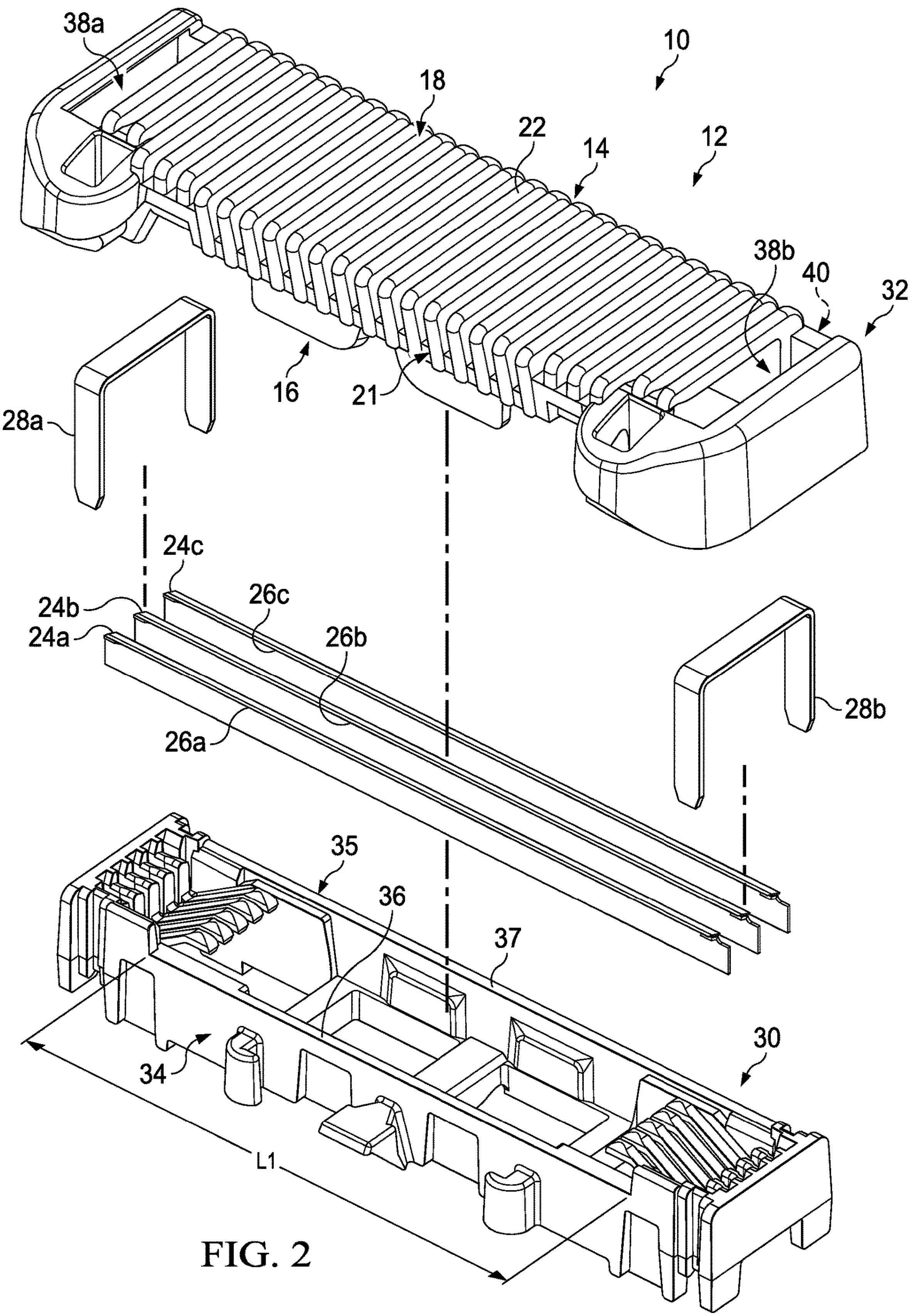
FIG. 2 is an assembly view of the razor cartridge of FIGS. 1A and 1B.

As shown in FIG. 2, one or more blades 24*a* 24*b* and 24*c* may be mounted within the housing 12, as shown in FIG. 2. Each of the blades 24*a* 24*b* and 24*c* may have a corresponding cutting edge 26*a* 26*b* and 26*c*. The first blade 24*a* and first blade edge 26*a* may be immediately adjacent the ribs 22 of the front face 16. Although three blades 24*a*, 24*b* and 24*c* are shown, the razor cartridge 10 may have more or fewer blades 24 depending on the desired performance and cost of the razor cartridge 10. The open slots 18 and 20 may extend transverse to the cutting edges 26*a* 26*b* and 26*c*. The blades 24*a* 24*b* and 24*c* may be secured to the housing 12 with one or more clips 28*a* and 28*b*. The blades 24 may be fixed in the housing 12 or may be resiliently mounted such that the blade members 24, (e.g., respective cutting edges 26) are biased against the clips 28*a* and 28*b*. The clips 28*a* and 28*b* may aid in retaining the blades 24*a*, 24*b* and 24*c* in an up and down direction (i.e., toward and away from the upper skin contacting surface 14. The clips 28*a* and 28*b* may comprise a metal, such as aluminum, but plastic may also be used. The clips 28*a* and 28*b* may also be interconnected to form a one-piece assembly. Other assembly methods known to those skilled in the art may also be used to secure and/or mount the blades 24*a*, 24*b* and 24*c* to the housing 12 including, but not limited to, wire wrapping, cold forming, hot staking, insert molding, ultrasonic welding, and adhesives. As will be described in greater detail below, the ribs 22 may prevent the cutting edges 26*a*, 26*b* and 26*c* from contacting the skin during a stroke, so only hair is cut not skin.

Referring to FIG. 2, an assembly view of the shaving razor cartridge 10 is illustrated. In certain embodiments, the housing 12 may comprise a two-piece assembly. For example, the housing 12 may comprise a base 30 (e.g., a lower portion) and a cage 32 (e.g., an upper portion) that is mounted over the base 30. In certain embodiments, the base 30 may be permanently fixed to the case 32. Accordingly, the cage 32 may define the upper skin contacting surface 14 and the blades 24*a*, 24*b* and 24*c* may be mounted to the base 30. In certain embodiments, the cage 32 may secure the blades 24 within the base 30 (with or without the clips 28*a* and 28*b*). For example, the clips 28 may provide either a temporary or an extra measure of securement for the blades 24*a*, 24*b* and 24*c*.

The base 30 may have a front wall 34 and a rear wall 35 with respective top surfaces 36 and 37. The first blade edge 26*a* may be immediately behind the front wall 34 to facilitate the unobstructed passage of hair to the first blade edge 26*a*. One or more of the top surfaces 36 and 37 may be recessed relative to the cutting edges 26*a*, 26*b* and 26*c*. The top surfaces 36 and 37 may extend along a length "L1". It is understood that the front wall 34 and the rear wall 35 may have one or more projecting features to aid in securement of the base 30 to the cage 32. The top surfaces 36 and 37 may extend between and positioned below the clips 28*a* and 28*b*. The top surface 36 being recessed may allow for an open area in front of the first blade edge 26*a* so hair is not trapped, as well as provide for an area on the housing for the clips 28*a* and 28*b* to rest above the top surface 36. For example, one or more of the top surfaces 36 and 37 may be recessed relative to the first cutting edge 26*a* by more than 0.20 mm, such that the top surface 36 and 37 do not interfere with or touch the skin, during trimming of hair. As will be explained in greater detail below, all of the blades 24*a*, 24*b*, and 24*c* may be mounted to the base 30 such that the cutting edges 26*a*, 26*b* and 26*c* are positioned above the top surface 36 along the length "L1". In certain embodiments, L1 may be about 17 mm to about 35 mm. Accordingly, all the cutting edges 26*a*, 26*b* and 26*c* are not protected by a guard and cap as traditional razor cartridges and thus all the shaving forces would be applied directly to the cutting edges 26*a*, 26*b* and 26*c* because the top surfaces 36 and 37 are recessed such that they do not act as a guard and cap to support (e.g., contact) the skin. However, the cage 32 may be mounted over the base 30 to prevent the cutting edges 26 from contacting the skin, thus resulting in a very safe shave by cutting the hairs to a pre-determined length. The clips 28*a* and 28*b* may be mounted to the base 30 prior to the cage 32 being mounted to the base 32. The cage 32 may define a pair of openings 38*a* and 38*b* dimensioned to receive the corresponding clips 28*a* and 28*b*. The cage 32 may be spaced apart from the clips 28*a* and 28*b*, to facilitate simple assembly. For example, the openings 38*a* and 38*b* may allow the clips 28*a* and 28*b* to be secured to the housing 12 either before or after the cage 32 is mounted to base 30. The openings 38*a* and 38*b* may allow the cage 32 to directly contact the cutting edges 26*a*, 26*b* and 26*c* by not resting on top of the clips 28*a* and 28*b*. In certain embodiments, the cage 32 would rest directly against the cutting edges 26*a*, 26*b* and 26*c*, thus potentially eliminating the need for the clips 28. Furthermore, hair and shaving debris may become trapped between the cage 32 and the cutting edge 26 if the cage 32 rested on top of the clips 28 and not the cutting edges 26*a*, 26*b* and 26*c*. The openings 38*a* and 38*b* may be enclosed and extend between the front face 16 and a rear face 40. As also shown in FIG. 1B, the rear face 40 may interconnect the ribs 22 at a rear of the housing 12 (e.g., cage 32) and lower surface 21 may interconnect the ribs 22 at a front of the housing 12 (cage 32) to reinforce the ribs 22.

Figure 3:
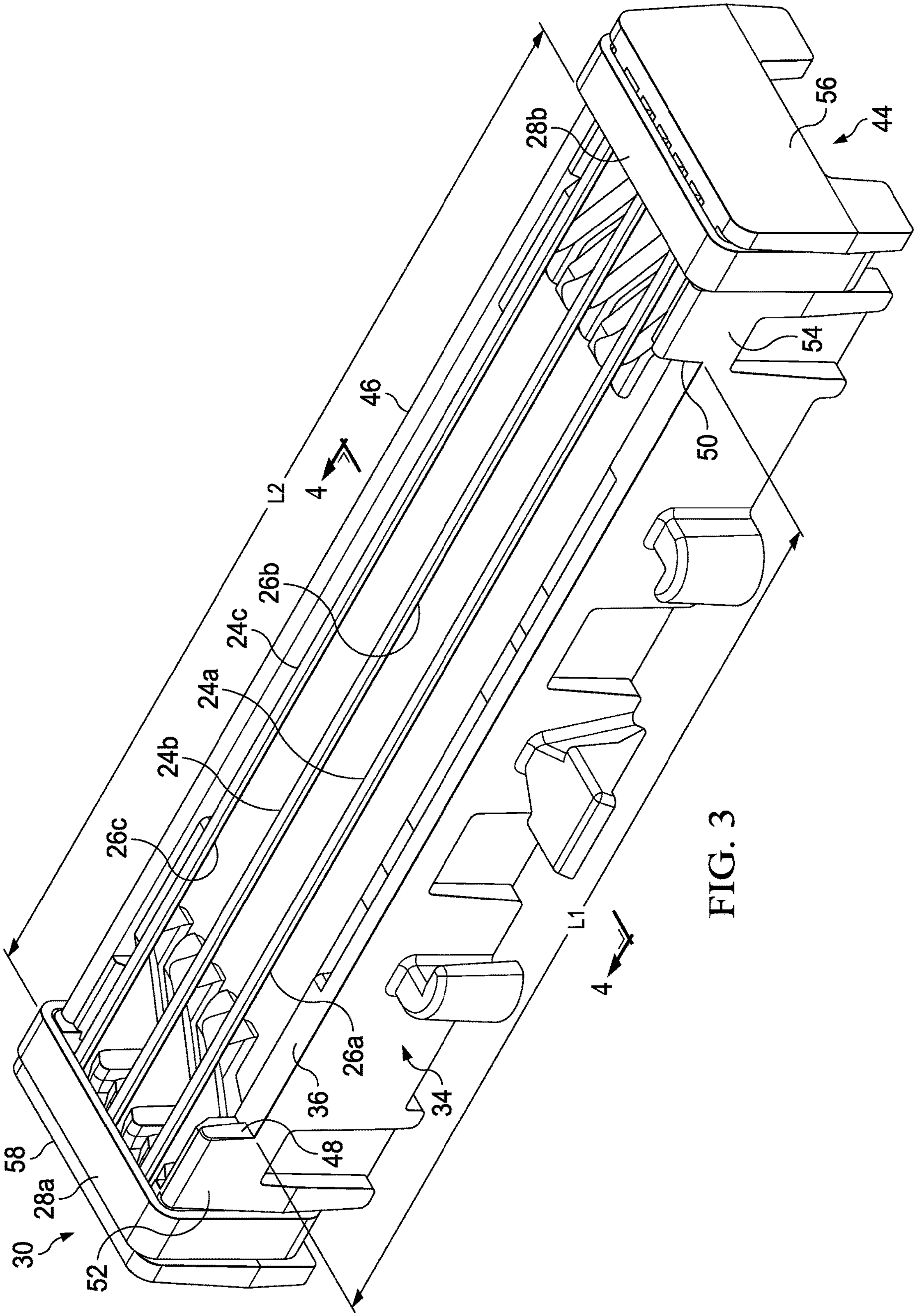
FIG. 3 is a perspective view of a subassembly of the razor cartridge of FIGS. 1A and 1B.

Referring to FIG. 3, a subassembly 44 is shown which may be incorporated in the shaving razor cartridge of FIG. 1. The subassembly 44 may include the base 30, blades 24*a*, 24*b* and 24*c* and clips 28*a* and 28*b*. The blades 24*a*, 24*b* and 24*c* may be mounted to the base 30 between the front wall 34 and a rear wall 46. In certain embodiments, the length "L1" of the top surface 36 of the front wall 34 may be at least 90% of an overall length "L2" of the blades 24*a*, 24*b* and 24*c* that are exposed (e.g., distances between the clips 28*a* and 28*b*). The top surface 36 may be bounded on lateral ends 48 and 50 by retaining walls 52 and 54. The retaining walls 52 and 54 may extend above the top surface 36 to facilitate the positioning and securement of the clips 28*a* and 28*b* to the base 30. For example, each clip 28*a* and 28*b* may be positioned between one of the retaining walls 52 and 54 and a corresponding lateral wall 56 and 58.

Figure 4:
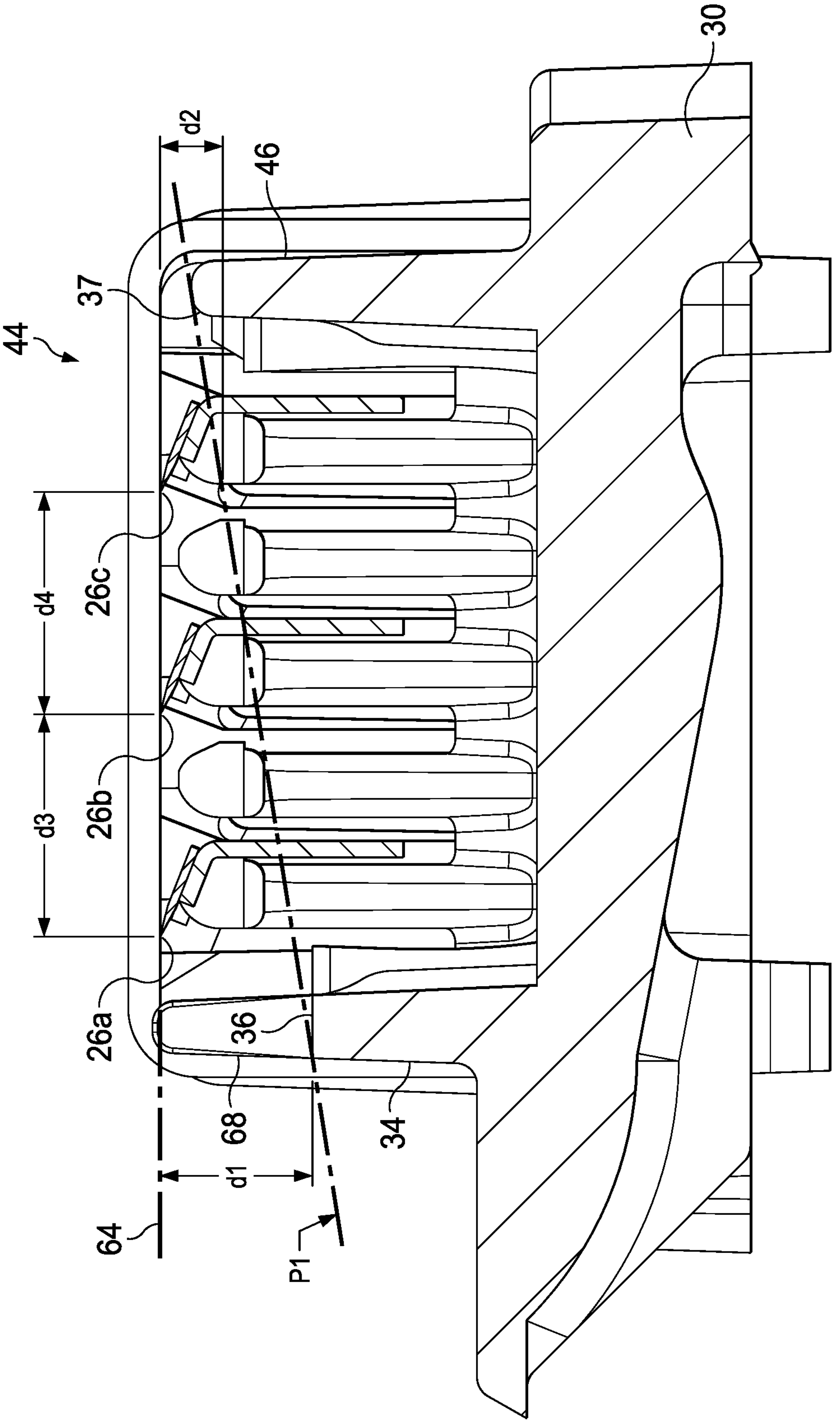
FIG. 4 is a cross section view of the subassembly in an upright position, taken generally along the line 4-4 of FIG. 3.

Referring to FIG. 4, a cross section view of the subassembly 44, taken generally along the line 4-4 of FIG. 3 is illustrated. The top surface 36 on the front wall 34 of the base 30 may be positioned a vertical distance of at least 0.5 mm below the cutting edges 26*a*, 26*b* and 26*c* (e.g., a cutting plane 64). In certain embodiments, the vertical distance d1 may be about 0.5 mm to about 5 mm. The position of the top surface 36 may allow the hair to reposition itself in a more upright position as hair is cut (e.g., by the first cutting edge 26*a*). For example, the top surface 36 may push down and trap long hairs in front of the blades 24, if the top surface 36 was positioned too close to the cutting plane 64 (or the first cutting edge 26*a*), thus negatively impacting cutting efficiency, especially for longer hairs that tend to lay flat on the skin. One or more of the cutting edges 26*a*, 26*b* and 26*c* may be positioned a vertical distance "d2" above a plane P1 tangent to the top surface 36 of the front wall 34 and a top surface 37 of the rear wall 46. The distance d2 may be greatest at the first cutting edge 26*a* closest to the front wall 34 and the least closest to the rear wall 46. It is believed, without being held to theory, that increasing d2 closer to the front wall 34 improves cutting efficiency. After the hair is trimmed by the first cutting edge 26*a*, it is less likely to lay flat because it is shorter, thus d2 may be less at the second cutting edge 26*b* and even less at the cutting edge 26*c* closest to the rear wall 46. In certain embodiments, d2 may be about 0.5 mm to about 3 mm as measured at any of the cutting edges 26*a*, 26*b* and 26*c*.

The shaving efficiency of the shaving razor cartridge 10 (FIG. 1) may be enhanced by improving rinsability. Traditional shaving razor cartridges rely on smaller distances between cutting edges or intermediate guards between adjacent blades for improved comfort because pressure is distributed between the cutting edges 26*a*, 26*b* and 26*c*. However, the ribs 22 (FIG. 1) absorb all of the pressure from the skin, not the cutting edges 26*a* 26*b* and 26*c*, which allows the cutting edges 26*a* 26*b* and 26*c* to be spaced further apart from each other. In certain embodiments, distances "d3" and "d4" between a pair of immediately adjacent cutting edges 26*a*, 26*b* and 26*c* may be greater than 1.75 mm, for example, about 1.8 mm to about 2.0 mm, or about 2.0 mm to about 2.5 mm, which may allow for even more effective rinsing by providing an open gap (as best seen in FIG. 3) between immediate cutting edges 26*a*, 26*b* and 26*c*, without sacrificing trimming efficiency or comfort.

Figure 5:
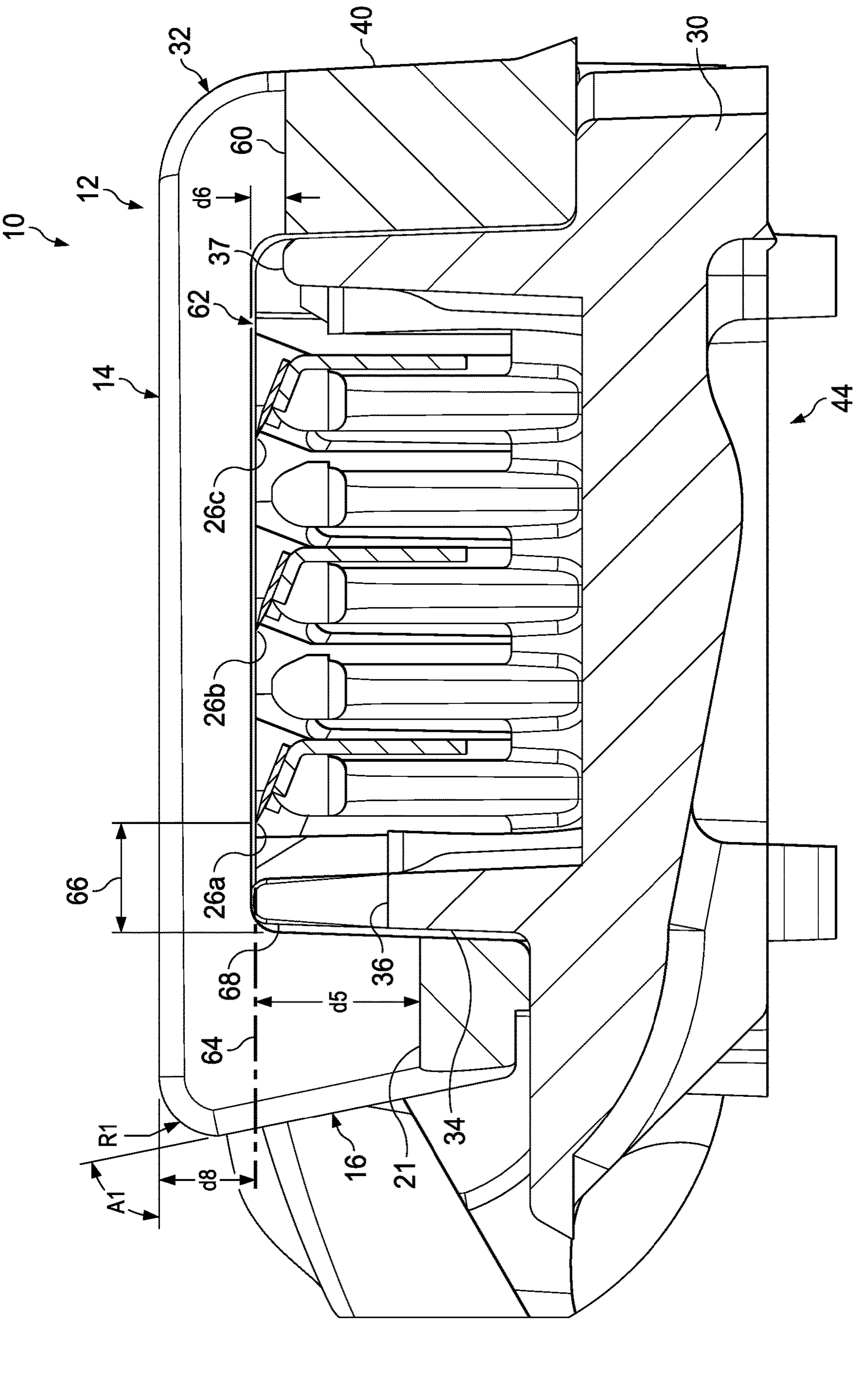
FIG. 5 is a cross section view of the razor cartridge, taken generally along the line 5-5 of FIG. 1.

Referring to FIG. 5, a cross section view of the shaving razor cartridge 10, taken generally along the line 4-4 of FIG. 1 is illustrated. The cage 32 may be mounted to the subassembly 44 (i.e., the base 30). The housing 12 (e.g., the base 30 and the cage 32) may allow for hair to freely pass through the slots 20 (FIG. 1) of the front face 16. The upper skin contacting surface 14 and the front face 16 may intersect at an exterior angle "A1" that is less than 90 degrees, for example, about 45 degrees to about 85 degrees to facilitate the passage of hair through the slots 20 (FIG. 1) of the front face 16. The intersection of the front face 16 and the upper skin contacting surface 14 may form a radius R1 of the ribs 22. In certain embodiments, R1 may be about 0.1 to about 3 mm and preferably about 0.25 mm to about 1 mm. The lower surface 21 may be positioned a vertical distance "d5" of at least 0.5 mm below the cutting edges 26*a*, 26*b* and 26*c* (e.g., about 0.5 mm to about 3 mm). The rear face 40 may have a top surface 60 extending between the ribs 22 (see also FIG. 1B) that is positioned a vertical distance "d6" below the cutting edges 26*a*, 26*b* and 26*c*, which may help release the hairs freely (i.e., prevent from hairs being flattened down during a shaving stroke), thus allowing for more efficient trimming of hair.

The upper skin contacting surface 14 may have an opposing interior surface 62 (e.g., height of the ribs 22). The length of the hair left after trimming with the shaving razor cartridge 10 may be determined by a vertical distance "d8" measured from the upper skin contacting surface 14 to the opposing interior surface 62 (e.g., if the cutting edges 26*a*, 26*b*, 26*c* are in contact with the opposing interior surface 62). It is understood that the cutting edges 26*a*, 26*b*, 26*c* may contact or be spaced apart from the opposing interior surface 62. The vertical distance "d8" may be about 0.5 mm to about 5 mm and more preferably about 1 mm to about 2.5 mm. If d8 is too small, skin may bulge between the ribs 22 and contact the skin, thus cutting the hair too short. Furthermore, hair longer than 5 mm tends to lay flat and thus will not be cut if d8 is greater than 5 mm.

It is believed, without being held to theory, that increasing the vertical distance d5 and d6 improves cutting efficacy by minimizing interference of the hair before it is cut by the first cutting edge 26*a* (for d5) after it is cut by the last cutting edge 26*c* (for d6). Accordingly, the exposure of the blade edges 26*a*, 26*b* and 26*c* may be determined by d8 (e.g., the height of the ribs 22) and not a feature such as a guard in front of the blades that can push hairs down against the skin making them more difficult to trim. Guards contacting the skin do not present such an issue for typical shaving razors because the cutting edges are contacting and shaving the skin (i.e., cutting hair at or below skin level). Accordingly, the blade edges are able to contact and cut the hairs that may lay flat, lift them up and cut them. However, cutting the hairs above skin level is more difficult because the cutting edges may not be able to reach hairs that lay flat. Accordingly, the housing 12 may define a horizontal gap 66 extending from the first cutting edge 26*a* to a front interior face 68, opposing the front face 16. In certain embodiments, the horizontal gap 66 may be about 0.5 mm to about 3.0 mm and preferably about 1 mm to about 2 mm. The gap 66 may allow for improved rinsing and allow longer trimmed hairs to rinse out through the housing 12. The gap 66 may also allow for hairs to release and be presented to the first cutting edge 26*a* in a more upright position. The front wall 34 and top surface 36 may be recessed and thus not extend into the gap 66. It is understood that the lateral end walls 52 and 54 (FIG. 3) are positioned laterally of the bottom surface 36 and thus also does not extend into the gap 66.

The positioning of the ribs 22 (FIGS. 1A and 1B) over the cutting edges 26*a*, 26*b* and 26*c* helps prevent the skin from contacting the cutting edges 26*a*, 26*b* and 26*c* and eliminates the need of a guard bar in front of the cutting edges 26*a*, 26*b* and 26*c* to support the skin. For example, the height and the spacing of the ribs 22 may prevent skin from bulging between the ribs and contacting the cutting edges 26*a*, 26*b* and 26*c*. Furthermore, the ribs 22 (FIGS. 1A and 1B) may also allow the cutting edges 26*a*, 26*b* and 26*c* to be spaced further apart from each other because the cutting edges 26*a*, 26*b* and 26*c* do not exert pressure against the skin.

The dimensions and values disclosed herein are not to be understood as being strictly limited to the exact numerical values recited. The term "about" should be interpreted herein as within typical manufacturing tolerances.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A subassembly in an upright position for a shaving razor cartridge comprising:

a base having a front wall with a top surface and a rear wall with a top surface;

at least one blade being mounted to the base between the front wall and the rear wall, the at least one blade having a cutting edge;

a cage mounted over the base, the cage having a front face defined by a plurality of ribs and a lower surface defining a plurality of open slots, wherein the front face of the cage is positioned in front of the front wall of the base to direct hair to the open slots, wherein the cutting edge is positioned at least 0.5 mm above a plane tangent to the top surface of the front wall and the top surface of the rear wall.

2. The subassembly of claim 1 wherein the lower surface is positioned a vertical distance of at least 0.5 mm below the cutting edge.

3. The subassembly of claim 2 wherein the cage has a rear face with a top surface extending between the ribs that is positioned a vertical distance below the cutting edge.

* * * * *